Feb. 6, 1962 R. GILLIS 3,020,335

COLOR CODED CABLE

Filed March 16, 1960

INVENTOR
R. GILLIS
BY S. Gundersen
ATTORNEY

United States Patent Office 3,020,335
Patented Feb. 6, 1962

3,020,335

COLOR CODED CABLE

Randall Gillis, Eggertsville, N.Y., assignor to Western Electric Company, Incorporated, New York, N.Y., a corporation of New York Filed Mar. 16, 1960, Ser. No. 15,351
3 Claims. (Cl. 174—112)

Figures 1, 2, 3, 4:
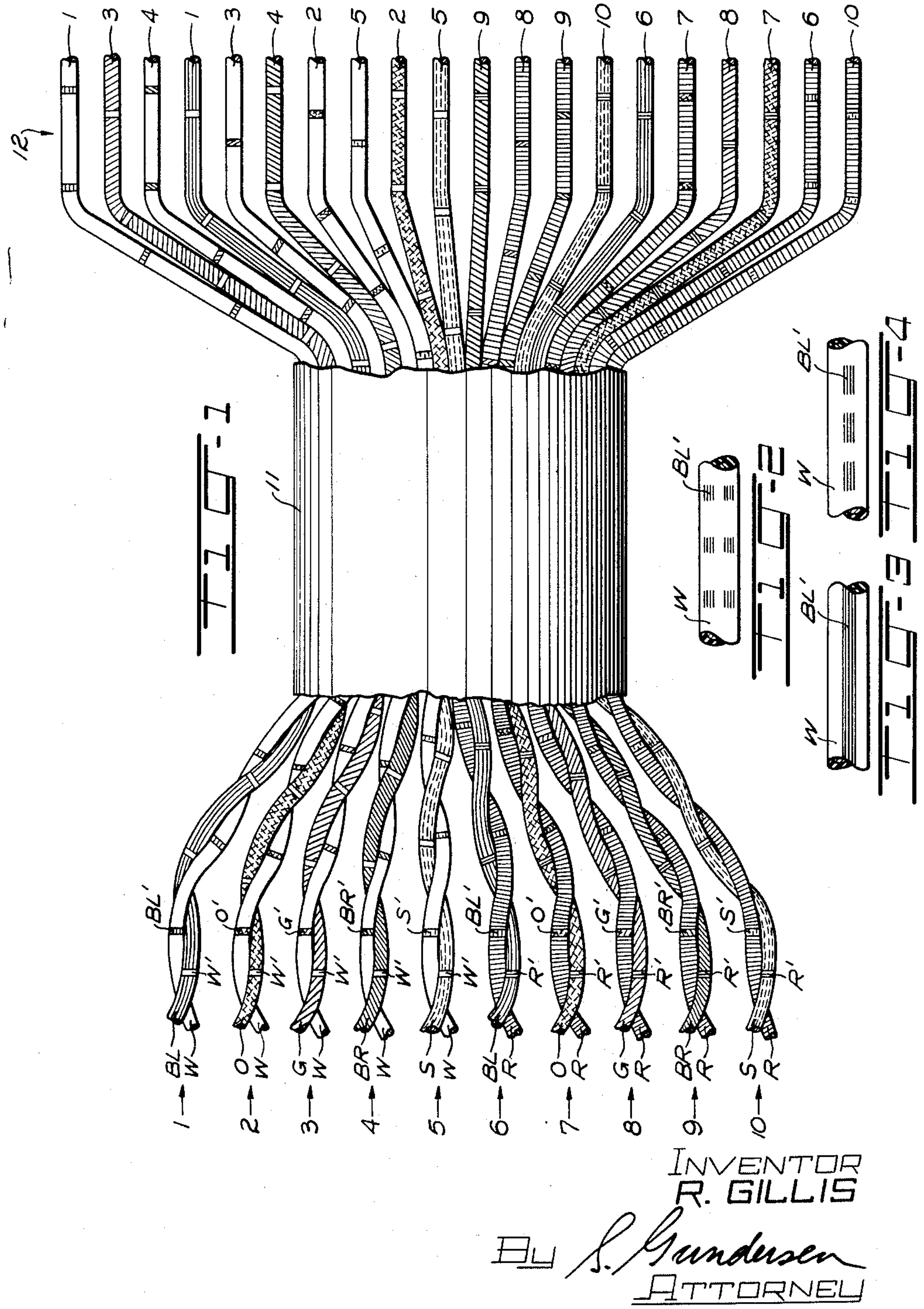

This invention relates to cables and particularly to an improved color code for identifying wires in cables.

A standard color-coded telephone cable is described in the United States patent application of W. T. Hicks, Serial Number 782,538 filed December 23, 1958. The cable as set forth therein comprises, in one embodiment, a single unit consisting of twenty-five distinctive pairs of conductors. Each pair is utilized in a subscriber's circuit wherein one conductor is designated "ring" and connected to specific components in the circuit and the other conductor is designated "tip" and connected to other components in the circuit. The "ring" conductors have base colors chosen from the group comprising blue, orange, green, brown and slate and the other conductor for the "tip" side of the circuit is coded with a base color chosen from the group white, red, black, yellow and violet. A coding sequence is followed by taking the "ring" colors in sequence with the first "tip" color for pair numbers 1–5 and then with the second "tip" color for pair numbers 6–10, etc. Consequently, pair 1 is comprised of one conductor colored blue and the other conductor colored white and is commonly referred to as the blue-white pair. Successively, pair 2 is orange-white, pair 3 is green-white . . . pair 6 is blue-red, pair 7 is orange-red, pair 8 is green-red, etc.

In this or any other color coded telephone cable, the conductors of each pair are twisted together and are readily identifiable by their combination of colors as long as they remain twisted together. However, when the required twist lengths of the pairs are long or the cable is subjected to considerable handling before installation, the loose ends of the pairs become untwisted and it is difficult to determine which individual conductors comprise a particular pair.

Heretofore, with the existing code, upon removal of the conductor from the cable jacket, it was necessary either to carefully hand twist together the two conductors of a pair with a tight twist to prevent the conductors from becoming loose upon handling, or to "ring out" the loose conductors for positive identification of the pair when the pairs became untwisted. In either event much connecting time was lost during a telephone installation.

The object of this invention is to provide a cable having an improved coding system for the expeditious identification of the individual conductors or pairs of conductors therein.

In accordance with the general features of this invention, a cable consists of a plurality of pairs of distinctive coded conductors, each conductor being distinctly identifiable from the other conductors therein.

Other objects and a fuller understanding of this invention may be had by reference to the following drawings in which:

FIG. 1 is a view of a cable illustrating the conductors in a twisted and untwisted position; and FIGS. 2, 3 and 4 show alternate types of reference markings for the conductors.

The cable shown in the drawing consists of ten pairs of twisted conductors 1–10 extending through a cable jacket 11, the loose ends of the pairs shown untwisted as individual conductors generally referred to at 12. It is to be understood at the outset that while the illustrated cable consists of ten pairs of conductors, any number of pairs of conductors is practicable with this invention.

The coding of the pairs of conductors 1–10 follows a definite color sequence. For example, as seen in pairs 1–5, one conductor of each pair is colored with the first "tip" base color white (W) while the other conductor is colored with one of the "ring" base colors from the color group consisting of the colors blue (BL), orange (O), green (G), brown (BR) and slate (S), respectively. Thus, pair 1 consists of one conductor having the base color blue (BL) while the other conductor has the base color white (W), this pair being commonly referred to as a blue-white pair. Similarly, pair 2 is orange-white; pair 3, green-white; pair 4, brown-white; and pair 5, slate-white. The same code is followed with pairs 6–10 except the second "tip" base color red (R) is substituted for the base color white (W) and combined in sequence with the "ring" base colors. Thus the conductors of pair 6 consists of the base colors blue-red; pair 7, orange-red; pair 8, green-red; pair 9, brown-red; and pair 10, slate-red.

As seen in FIG. 1, relative small reference markings (having prime letters for reference numerals) such as solid transverse lines are spaced along the length of each conductor. In alternate embodiments, the reference markings on the conductor can be either discontinuous transverse lines (FIG. 2), solid longitudinal lines (FIG. 3), or discontinuous longitudinal lines (FIG. 4). However, it is to be understood that the reference marking be not limited to a type hereinbefore described as any desired configuration can be utilized. The color of the reference marking on one conductor of each pair corresponds to the base color of the other conductor of the pair. For example, in pair 1, the white base conductor (W) has a reference marking thereon colored blue (BL'), while the blue base conductor (BL) has a reference marking thereon colored white (W'). Similarly, in pair 2 the white base conductor (W) has a reference marking thereon colored orange (O') while the orange base conductor (O) has a marking thereon colored white (W'). The conductors of each and every pair are similarly marked following the same color coded sequence as hereinbefore described.

The markings, preferably made with ink, provide a cross-reference between the two base colors of a pair to permit visual, positive identification of the conductors belonging to that particular pair, while retaining the advantages of the standard colored code with the familiar small number of colors disclosed in the W. T. Hicks' application, Serial Number 782,538. Thus, the loss of pair twists to an installer at a terminal is of no significance. Further, due to this new color coding system, a longer twist length may be utilized in some types of cable thereby making possible an increase of cable output from the twisting apparatus used in fabricating the cable.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A cable comprising a plurality of twisted pairs of distinctive coded conductors, a different base marking on each conductor of each pair, and each of the conductors of each twisted pair having a reference marking thereon corresponding to the base marking on the other conductor of the twisted pair.

2. A cable comprising a plurality of twisted pairs of distinctive color coded conductors, a different base color on each conductor of each pair, and each of the conductors of each twisted pair having a reference color thereon corresponding to the base color of the other conductor of the twisted pair.

3. A cable comprising a plurality of twisted pairs of distinctive color coded conductors, a different base color totally covering each conductor of each pair, and each of the conductors of each twisted pair having reference markings spaced along their lengths corresponding to the base marking of the other conductor of the twisted pair.

References Cited in the file of this patent

UNITED STATES PATENTS

| | | |
|---|---|---|
| 1,856,676 | Weston | May 3, 1932 |
| 2,106,048 | Candy | Jan. 18, 1938 |